US011859883B2

(12) United States Patent
Lee et al.

(10) Patent No.: US 11,859,883 B2
(45) Date of Patent: *Jan. 2, 2024

(54) FLOW DISTURBANCE APPARATUS AND AIR CONDITIONER COMPRISING THE SAME

(71) Applicants: LG ELECTRONICS INC., Seoul (KR); KOREA ADVANCED INSTITUTE OF SCIENCE AND TECHNOLOGY, Daejeon (KR)

(72) Inventors: Yohan Lee, Seoul (KR); Bongjun Kim, Seoul (KR); Sehyeon Kim, Seoul (KR); Jaeyoung Kim, Seoul (KR); Minwoo Jeong, Seoul (KR); Hyungjin Sung, Daejeon (KR); Jaebok Lee, Seoul (KR); Sunggoon Park, Daejeon (KR)

(73) Assignees: LG ELECTRONICS INC., Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/841,884

(22) Filed: Jun. 16, 2022

(65) Prior Publication Data

US 2022/0307743 A1 Sep. 29, 2022

Related U.S. Application Data

(63) Continuation of application No. 16/622,634, filed as application No. PCT/KR2018/005542 on May 15, 2018, now Pat. No. 11,365,917.

(30) Foreign Application Priority Data

May 16, 2017 (KR) ........................ 10-2017-0060593

(51) Int. Cl.
*F25B 41/40* (2021.01)
*B01F 25/431* (2022.01)
(Continued)

(52) U.S. Cl.
CPC ........ *F25B 41/40* (2021.01); *B01F 25/43161* (2022.01); *B01F 25/431971* (2022.01);
(Continued)

(58) Field of Classification Search
CPC .... B01F 31/81; B01F 31/44; B01F 25/43171; B01F 25/43161; B01F 25/431971; F28F 13/12
See application file for complete search history.

(56) References Cited

U.S. PATENT DOCUMENTS 1,605,401 A * 11/1926 Hamilton ................ F02M 1/00 138/40
2,079,144 A * 5/1937 Appa ..................... F28F 13/12 138/38
(Continued)

FOREIGN PATENT DOCUMENTS

EP 2 248 581 11/2010
JP 08-159689 6/1996
(Continued)

OTHER PUBLICATIONS

International Search Report (with English Translation) dated Sep. 18, 2018 issued in Application No. PCT/KR2018/005542.
(Continued)

*Primary Examiner* — Christopher R Zerphey
(74) *Attorney, Agent, or Firm* — KED & ASSOCIATES

(57) ABSTRACT

A flow disturbance apparatus includes: a refrigerant pipe having a flow space in which refrigerant flows; and at least one disturbance member disposed inside the refrigerant pipe
(Continued)

that is vibrated by the flow of refrigerant in the refrigerant pipe to disturb the refrigerant flowing in the refrigerant pipe.

18 Claims, 16 Drawing Sheets

(51) Int. Cl.

| | |
|---|---|
| ***B01F 31/44*** | (2022.01) |
| ***B01F 31/81*** | (2022.01) |
| ***F15D 1/02*** | (2006.01) |
| ***F28F 13/12*** | (2006.01) |

(52) U.S. Cl.

CPC .............. *B01F 31/44* (2022.01); *B01F 31/81* (2022.01); *F15D 1/02* (2013.01); *F28F 13/12* (2013.01)

(56) References Cited

U.S. PATENT DOCUMENTS

| | | | | | |
|---|---|---|---|---|---|
| 3,278,165 | A | | 10/1966 | Gaffney | |
| 3,408,050 | A | | 10/1968 | Jacobs, III | |
| 4,306,816 | A | * | 12/1981 | Folland | B01F 31/81 366/119 |
| 4,896,383 | A | * | 1/1990 | Morgan | A61H 33/6052 4/491 |
| 4,981,368 | A | | 1/1991 | Smith | |
| 5,120,445 | A | * | 6/1992 | Colman | B01D 65/08 210/640 |
| 5,330,267 | A | * | 7/1994 | Tauscher | B01F 25/4316 366/337 |
| 5,727,398 | A | * | 3/1998 | Phillippe | F25B 41/30 138/40 |
| 5,800,059 | A | | 9/1998 | Cooke et al. | |
| 5,975,750 | A | * | 11/1999 | Semp | B05B 17/0692 366/119 |
| 6,112,768 | A | | 9/2000 | Rath et al. | |
| 6,598,422 | B1 | | 7/2003 | Smith | |
| 8,365,725 | B2 | * | 2/2013 | King | A61M 15/008 128/200.24 |
| 9,702,602 | B2 | | 7/2017 | Phillippe et al. | |
| 10,288,365 | B2 | | 5/2019 | Shin | |

FOREIGN PATENT DOCUMENTS

| | | |
|---|---|---|
| JP | 2004-044880 | 2/2004 |
| JP | 2004-191034 | 7/2004 |
| JP | 4549033 | 9/2010 |
| JP | 2012-057849 | 3/2012 |
| KR | 10-2006-0044230 | 5/2006 |
| KR | 10-1197775 | 11/2012 |
| KR | 10-2014-0110492 | 9/2014 |
| KR | 10-2015-0054027 | 5/2015 |
| KR | 10-1536552 | 7/2015 |
| KR | 10-1681007 | 11/2016 |
| SU | 1 198 367 | 12/1985 |

OTHER PUBLICATIONS

Written Opinion (with English Translation) dated Sep. 18, 2018 issued in Application No. PCT/KR2018/005542.

Korean Notice of Allowance issued in Application No. 10-2017-0060593 dated Jul. 19, 2019.

European Search Report issued in Application No. 18802180.2 dated Jan. 29, 2021.

U.S. Office Action issued in U.S. Appl. No. 16/622,634 dated Nov. 5, 2021.

U.S. Notice of Allowance issued in U.S. Appl. No. 16/622,634 dated Feb. 25, 2022.

* cited by examiner

FLOW DISTURBANCE APPARATUS AND AIR CONDITIONER COMPRISING THE SAME

This application is a Continuation Application of U.S. patent application Ser. No. 16/622,634 filed Dec. 13, 2019, which is a U.S. National Stage Application under 35 U.S.C. § 371 of PCT Application No. PCT/KR2018/005542, filed May 15, 2018, which claims priority to Korean Patent Application No. 10-2017-0060593, filed May 16, 2017, whose entire disclosures are hereby incorporated by reference.

TECHNICAL FIELD

The present invention relates to a flow disturbance apparatus.

BACKGROUND ART

Generally, an air conditioner is an electronic appliance for cooling or heating a space using a refrigeration system based on characteristics associated with refrigerant pressures and temperature changes.

A conventional refrigeration system comprises a compressor that compresses a refrigerant into a high-temperature, high-pressure gaseous state, a condenser that condenses the refrigerant compressed by the compressor into a liquid state by the heat released by the air blown from a cooling fan, an expansion unit that expands the liquid refrigerant condensed by the condenser into a low-pressure liquid refrigerant through throttling, and an evaporator that evaporates the refrigerant expanded by the expansion unit and transfers it to the compressor.

In such an air conditioner, the refrigerant supplied to the evaporator or/and condenser is supplied through a refrigerant tube. The refrigerant tube constitutes a refrigerant path in a limited space of an indoor unit or outdoor unit, thus forming a plurality of bends in the refrigerant path. The liquid refrigerant is radially concentrated at the bends of the refrigerant path by a centrifugal force due to the difference in specific gravity between the liquid refrigerant and gaseous refrigerant, and this leads to a decrease in heat exchange efficiency at the condenser and evaporator.

DISCLOSURE

Technical Problem

An aspect of the present invention is to provide a flow disturbance apparatus that is installed in a refrigerant path and enables uniform flow of refrigerant.

Another aspect of the present invention is to provide a flow disturbance apparatus that allows a refrigerant mixture of liquid refrigerant and gaseous refrigerant to be distributed uniformly throughout tubes in a heat exchanger.

Technical problems to be solved by the present invention are not limited to the above-mentioned technical problems, and other technical problems not mentioned herein may be clearly understood by those skilled in the art from description below.

Technical Solution

A flow disturbance apparatus according to the present invention may include at least one flow disturbance member that is disposed inside a refrigerant tube and disturbs the refrigerant flowing through the refrigerant tube as it vibrates due to the flow of the refrigerant in the refrigerant tube.

Concretely, a flow disturbance apparatus according to the present invention may include: a refrigerant pipe having a flow space in which refrigerant flows; and at least one disturbance member disposed inside the refrigerant pipe, that is vibrated by the flow of refrigerant in the refrigerant pipe to disturb the refrigerant flowing in the refrigerant pipe.

One end of the disturbance member may be a fixed end connected to an inner surface of the refrigerant pipe, and the other end of the disturbance member may be a free end positioned in the flow space of the refrigerant pipe.

In the direction of refrigerant flow, the fixed end of the disturbance member may be disposed ahead of the free end of the disturbance member.

The disturbance member may include: a blade portion having a predetermined level of stiffness; and a connecting portion having higher elasticity than the blade portion.

The blade portion may be disposed closer to the center of the refrigerant pipe than the connecting portion.

The disturbance member may include: a blade portion having a predetermined width; and a connecting portion having a smaller width than the blade portion.

The blade portion may be disposed closer to the center of the refrigerant pipe than the connecting portion.

The disturbance member may include a flexible material.

The disturbance member may include: a plurality of upper disturbance members disposed in the direction of travel of refrigerant on one side of the refrigerant pipe; and a plurality of lower disturbance members disposed in the direction of travel of refrigerant on the other side facing the one side of the refrigerant pipe, wherein the fixed ends of the upper disturbance members and the fixed ends of the lower disturbance members may not overlap vertically.

A plurality of disturbance members may be disposed at intervals on a virtual spiral line formed on the inner surface of the refrigerant pipe.

The disturbance members may be disposed in such a way as not to overlap within one cycle of the spiral line, when viewed in the direction of refrigerant flow.

The disturbance member may have a curvature.

The refrigerant pipe may include a bent region in which the direction of refrigerant flow is switched, and the disturbance member is disposed in the bent region.

The flow disturbance apparatus may further include a disturbance groove formed on the inner surface of the refrigerant pipe to disturb the refrigerant.

The disturbance groove may be disposed in such a way as not to overlap the disturbance member in a front-back direction.

The length of the disturbance member may be smaller than the radius of the refrigerant pipe.

Another exemplary embodiment of the present invention provides an air conditioner including: a compressor that compresses refrigerant; an outdoor heat exchanger that is installed outdoors and exchanges heat between outdoor air and the refrigerant; an indoor heat exchanger that is installed indoors and exchanges heat between indoor air and the refrigerant; and a flow disturbance apparatus for disturbing the refrigerant flowing inside the air conditioner, wherein the flow disturbance apparatus may include: a refrigerant pipe having a flow space in which refrigerant flows; and at least one disturbance member disposed inside the refrigerant pipe, that is vibrated by the flow of refrigerant in the refrigerant pipe to disturb the refrigerant flowing in the refrigerant pipe.

One end of the disturbance member may be a fixed end connected to an inner surface of the refrigerant pipe, and the other end of the disturbance member may be a free end positioned in the flow space of the refrigerant pipe.

In the direction of refrigerant flow, the fixed end of the disturbance member may be disposed ahead of the free end of the disturbance member.

The disturbance member may include: a blade portion having a predetermined level of stiffness; and a connecting portion having higher elasticity than the blade portion.

Advantageous Effects

A flow disturbance apparatus according to the present invention has one or more of the following advantages.

The first advantage is that, even if refrigerant is concentrated in one direction due to space limitation, the refrigerant supplied to each refrigerant tube of a heat exchanger is uniformly distributed.

The second advantage is that the uniform distribution of the refrigerant supplied to each refrigerant tube of the heat exchanger allows for an increase in the heat exchange efficiency of the heat exchanger.

MODE FOR INVENTION

Figure 1:
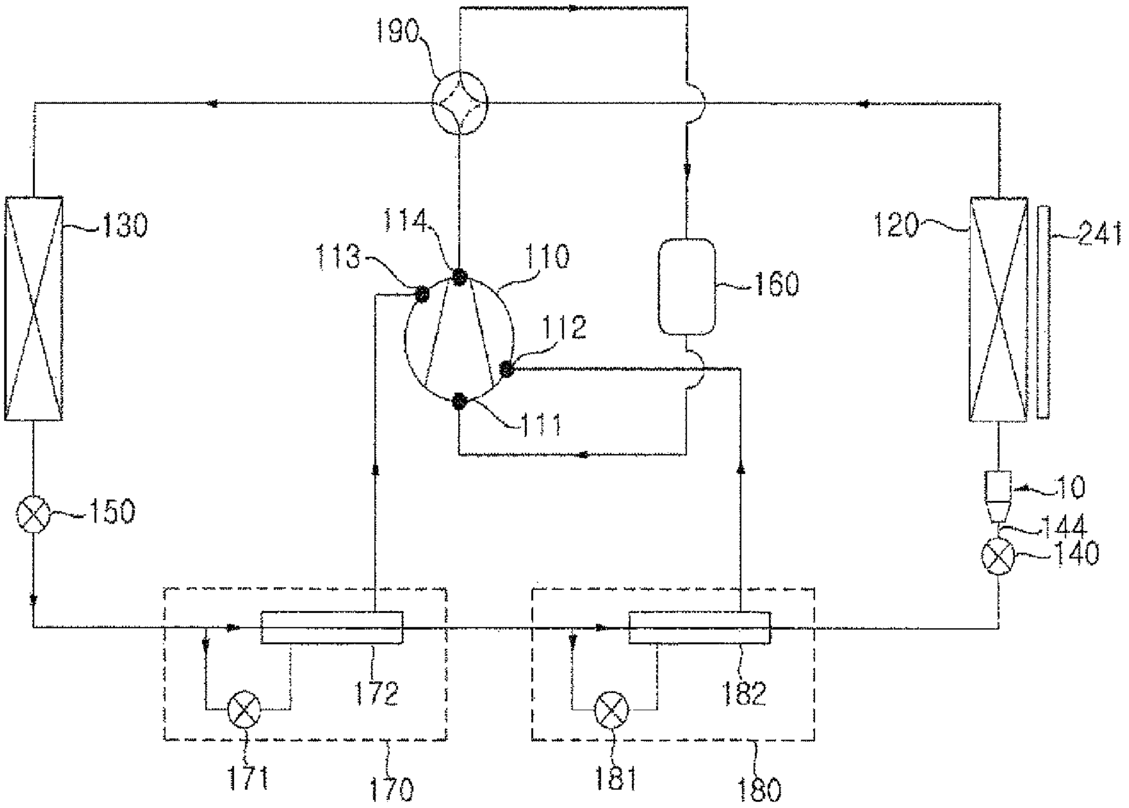
FIG. 1 is a diagram illustrating the flow of refrigerant in an air conditioner according to an exemplary embodiment of the present invention.

Advantages and features of the present disclosure and methods for achieving them will be made clear from embodiments described below in detail with reference to the accompanying drawings. The present disclosure may, however, be embodied in many different forms and should not be construed as being limited to the embodiments set forth herein. Rather, these embodiments are provided so that this disclosure will be thorough and complete, and will fully convey the scope of the invention to those skilled in the art. The present disclosure is merely defined by the scope of the claims. Like reference numerals refer to like elements throughout the specification.

Spatially relative terms such as "below," "beneath," "lower," "above," or "upper" may be used herein to describe one element's relationship to another element as illustrated in the drawings. It will be understood that spatially relative terms are intended to encompass different orientations of the elements during use or operation of the elements in addition to the orientation depicted in the drawings. For example, if the elements in one of the drawings are turned over, elements described as "below" or "beneath" other elements would then be oriented "above" the other elements. The exemplary terms "below" or "beneath" can, therefore, encompass both an orientation of above and below. Since the elements may be oriented in another direction, the spatially relative terms may be interpreted in accordance with the orientation of the elements.

The terminology used in this specification is for the purpose of describing particular embodiments only and is not intended to limit the present invention. As used in this specification, the singular forms are intended to include the plural forms as well unless context clearly indicates otherwise. It will be further understood that the terms "comprises" and/or "comprising," when used in this specification, specify the presence of stated elements, steps, and/or operations, but do not preclude the presence or addition of one or more other elements, steps, and/or operations.

Unless otherwise defined, all terms (including technical and scientific terms) used in this specification have the same meaning as commonly understood by a person having ordinary skill in the art to which the present invention pertains. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, the thickness or size of each element may be exaggerated, omitted, or schematically illustrated for convenience of description and clarity. Also, the size or area of each element may not entirely reflect the actual size thereof.

In addition, angles or directions used to describe the structures of embodiments of the present invention are based on those shown in the drawings. Unless there is, in this specification, no definition of a reference point to describe angular positional relations in the structures of embodiments of the present invention, the associated drawings may be referred to.

Hereinafter, the present invention will be described in concrete details with reference to the accompanying drawings.

FIG. 1 is a diagram illustrating the flow of refrigerant in an air conditioner according to an exemplary embodiment of the present invention. Needless to say, although FIG. 1 is illustrated with respect to an air conditioner, the present invention is also applicable to a cycling device using refrigerant.

Referring to FIG. 1, the air conditioner according to an exemplary embodiment of the present invention comprises a compressor that compresses refrigerant, an outdoor heat exchanger that is installed outdoors and exchanges heat between outdoor air and the refrigerant, an indoor heat exchanger that is installed indoors and exchanges heat between indoor air and the refrigerant, and a flow disturbance apparatus 10 for disturbing the refrigerant flowing inside the air conditioner.

The compressor 110 compresses an incoming low-temperature, low-pressure refrigerant into a high-temperature, high-pressure refrigerant. The compressor 110 may come in various structures, and may be a reciprocating compressor which uses a cylinder and a piston or a scroll compressor which uses a fixe scroll and an orbiting scroll. In this exemplary embodiment, the compressor 110 is a scroll compressor 110. A plurality of compressors 110 may be provided depending on the embodiment.

The compressor 110 comprises a first inlet port 111 through which the refrigerant evaporated in the outdoor heat exchanger 120 enters in a heating operation or the refrigerant evaporated in the indoor heat exchanger 130 enters in a defrosting operation, a second inlet port 112 through which the relatively low-pressure refrigerant expanded and evaporated in a second injection module 180 enters, a third inlet port 113 through which the relatively high-pressure refrigerant expanded and evaporated in a first injection module 170 enters, and a discharge port 114 through which compressed refrigerant is discharged.

In this exemplary embodiment, the heating operation is an operation mode in which the indoor heat exchanger 130 condenses refrigerant to heat indoor air, and the cooling operation is an operation mode in which the indoor heat exchanger 130 evaporates refrigerant to cool indoor air.

Preferably, the second inlet port 112 is formed at a low pressure side of a compression chamber of the compressor 110 where refrigerant is compressed, and the third inlet port 113 is formed at a high pressure side of the compression chamber of the compressor 110. The high pressure side of the compression chamber refers to a portion where the temperature and pressure are relatively high compared with the low pressure side of the compression chamber.

The refrigerant entering through the first inlet port 111 has a lower pressure and temperature than the refrigerant entering through the second inlet port 112, and the refrigerant entering through the second inlet port 112 has a lower pressure and temperature than the refrigerant entering through the third inlet port 113. The refrigerant entering through the third inlet port 113 has a lower pressure and temperature than the refrigerant discharged through the discharged port 114.

The compressor 110 compresses the refrigerant entering through the first inlet port 111 in the compression chamber and mixes it with the refrigerant entering through the second inlet port 112 formed at the low pressure side of the compression chamber and compresses the mixture. The compressor 110 compresses the refrigerant mixture and mixes it with the refrigerant entering through the third inlet port 113 formed at the high pressure side of the compression chamber and compresses the mixture. The compressor 110 compresses the refrigerant mixture and discharges it through the discharge port 114.

A gas-liquid separator 160 separates gaseous refrigerant and liquid refrigerant from the refrigerant evaporated in the indoor heat exchanger 130 in the defrosting operation or from the refrigerant evaporated in the outdoor heat exchanger 120 in the heating operation. The gas-liquid separator 160 is provided between a switching part 190 and the first inlet port 111 of the compressor 110. The gaseous refrigerant separated by the gas-liquid separator 160 enters through the first inlet port 111 of the compressor 110.

The switching part 190 is a flow path switching valve for switching between cooling and heating, which directs the refrigerant compressed by the compressor 110 to the indoor heat exchanger 130 in the heating operation and directs it to the outdoor heat exchanger 120 in the defrosting operation.

The switching part 190 is connected to the discharge port 114 of the compressor 110 and the gas-liquid separator 160, and is connected to the indoor heat exchanger 130 and the outdoor heat exchanger 120. In the heating operation, the switching part 190 connects the discharge port 114 of the compressor 110 and the indoor heat exchanger 130 and connects the outdoor heat exchanger 120 and the gas-liquid separator 160. In the defrosting operation, the switching part 190 connects the discharge port 114 of the compressor 110 and the outdoor heat exchanger 120 and connects the indoor heat exchanger 130 and the gas-liquid separator 160.

The switching part 190 may be implemented in a variety of modules for connecting different flow path, and, in this exemplary embodiment, may be a four-way valve for switching flow paths. In some exemplary embodiments, the switching part 190 may be implemented as various types of valves or a combination thereof, such as a combination of two three-way valves that can switch four flow paths.

The outdoor heat exchanger 120 is placed in an outdoor space, and the refrigerant passed through the outdoor heat exchanger 120 exchanges heat with the outdoor air. The outdoor heat exchanger 120 acts as an evaporator for evaporating refrigerant in the heating operation and acts as a condenser for condensing refrigerant in the defrosting operation. The outdoor heat exchanger 120 may be installed in an outdoor unit 6 which will be described later.

The outdoor heat exchanger 120 is connected to the switching part 190 and an outdoor expansion valve 140. In the heating operation, the refrigerant expanded in the outdoor heat expansion valve 140 enters the outdoor heat exchanger 120 and is evaporated and then discharged to the switching part 190. In the defrosting operation, the refrigerant compressed by the compressor 110 and passed through the discharge port 114 of the compressor 110 and the switching part 190 enters the outdoor heat exchanger 120 and is condensed and then flows to the outdoor expansion valve 140.

The outdoor heat exchanger 120 may receive heat by a defrost unit 240 installed adjacent to the outdoor heat exchanger 120. Here, the defrost unit 240 may be a defrost heater 241 installed adjacent to the outdoor heat exchanger 120. The defrost heater 241 transforms electrical energy into thermal energy and supplies it to the outdoor heat exchanger 120. The defrost heater 241 performs defrosting by applying heat directly to the outdoor heat exchanger 120 without stopping the heating operation of the air conditioner.

The outdoor expansion valve 140 is adjusted to expand refrigerant in the heating operation, and is fully opened to pass the refrigerant through in the defrosting operation. The outdoor expansion valve 140 is connected to the outdoor heat exchanger 120 and the second injection module 180. The outdoor expansion valve 140 is provided between the outdoor heat exchanger 120 and the second injection module 180.

In the heating operation, the outdoor expansion valve 140 expands the refrigerant flowing from the second injection module 180 to the outdoor heat exchanger 120. In the defrosting operation, the outdoor expansion valve 140 allows the refrigerant entering from the outdoor heat exchanger 120 to pass through and directs it to the second injection module 180.

The indoor heat exchanger 130 is placed in an indoor space, and the refrigerant passing through the indoor heat exchanger 130 exchanges heat with indoor air. The indoor heat exchanger 130 acts as a condenser for condensing refrigerant in the heating operation and acts as an evaporator for evaporating refrigerant in the defrosting operation.

The indoor heat exchanger 130 is connected to the switching part 190 and an indoor expansion valve 150. In the heating operation, the refrigerant compressed by the compressor 110 and passed through the discharge port 114 and the switching part 190 enters the indoor heat exchanger 130 and is condensed and then flows to the indoor expansion valve 150. In the defrosting operation, the refrigerant expanded in the outdoor heat expansion valve 140 enters the outdoor heat exchanger 120 and is evaporated and then discharged to the switching part 190.

The indoor expansion valve 150 is fully opened to pass the refrigerant through in the heating operation, and is adjusted to expand refrigerant in the defrosting operation. The indoor expansion valve 150 is connected to the indoor heat exchanger 130 and the first injection module 170. The indoor expansion valve 150 is provided between the indoor heat exchanger 130 and the first injection module 170.

In the heating operation, the indoor expansion valve 150 allows the refrigerant entering from the indoor heat exchanger 140 to pass through and directs it to the first injection module 170. In the defrosting operation, the indoor expansion valve 150 expands the refrigerant flowing from the first injection module 170 to the indoor heat exchanger 130.

The first injection module 170 expands part of the refrigerant flowing between the indoor heat exchanger 130 and the outdoor heat exchanger 120 depending on the operating condition and injects it into the compressor 110 or not.

In the heating operation, the first injection module 170 expands part of the refrigerant flowing from the indoor heat exchanger 130 to the second injection module 180 and injects it into the high pressure side of the compressor 110. The first injection module 170 is connected to the indoor expansion valve 150, the third inlet port 113, and the second injection module 180.

In the heating operation, the first injection module 170 directs a part of the refrigerant flowing from the indoor heat exchanger 130 to the third inlet port 113 of the compressor 110 and injects it into the high pressure side of the compressor 110, and directs another part of the refrigerant flowing from the indoor heat exchanger 130 to the second injection module 180.

In the defrosting operation, the first injection module 170 does not operate but bypasses the refrigerant flowing from the second injection module 180 and directs it to the indoor expansion valve 150.

The first injection module 170 comprises a first injection expansion valve 171 for expanding a part of a flowing refrigerant and a first injection heat exchanger 172 for performing overcooling by exchanging heat between another part of the flowing refrigerant and the refrigerant expanded by the first injection expansion valve 171.

The first injection expansion valve 171 is connected to the indoor expansion valve 150 and the first injection heat exchanger 172. The first injection expansion valve 171 is adjusted in the heating operation to expand the refrigerant injected from the indoor heat exchanger 130 into the compressor 110, and is closed in the defrosting operation.

In the heating operation, the first injection expansion valve 171 expands part of the refrigerant passed through the indoor expansion valve 150 after exchanging heat in the indoor heat exchanger 130, and directs it to the first injection heat exchanger 172. In the heating operation, the degree of opening of the first injection expansion valve 171 is adjusted in such a way that the pressure of the refrigerant passing through it is equal to the pressure of the high pressure side of the compressor 110 to which the third inlet port 113 is connected.

In the defrosting operation, the first injection expansion valve 171 is closed, and the first injection module 170 therefore does not operate.

The first injection heat exchanger 172 is connected to the indoor expansion valve 150, the first injection expansion valve 171, a second injection expansion valve 181, a second injection heat exchanger 182, and the third inlet port 113.

The first injection heat exchanger 172 exchanges heat between the refrigerant flowing in the indoor heat exchanger 130 and the refrigerant expanded by the first injection expansion valve 171 in the heating operation, and allows the refrigerant flowing from the second injection module 180 to pass through without exchanging heat in the defrosting operation.

In the heating operation, the first injection heat exchanger 172 exchanges heat between part of the refrigerant passed through the indoor expansion valve 150 after exchanging heat in the indoor heat exchanger 130 and the refrigerant expanded by the first injection expansion valve 171. In the heating operation, the refrigerant overcooled in the first injection heat exchanger 172 flows to the second injection module 180, and the overheated refrigerant is injected into the third inlet port 113 of the compressor 110.

In the defrosting operation, if the first injection expansion valve 171 is closed, the first injection heat exchanger 172 bypasses the refrigerant flowing from the second injection module 180 and directs it to the indoor expansion valve 150.

The above-described first injection module 170 may not be comprised of the first injection expansion valve 171 and the first injection heat exchanger 172, but instead may be a gas-liquid separator that separates gaseous refrigerant and liquid refrigerant so that the gaseous refrigerant is injected.

The second injection module 180 may inject part of the refrigerant flowing between the indoor heat exchanger 130 and the outdoor heat exchanger 120 into the compressor 110 depending on the operating condition.

In the heating operation, the second injection module 180 expands part of the refrigerant flowing from the first injection module 170 to the outdoor heat exchanger 120 and injects it to the low pressure side of the compressor 110. The second injection module 180 is connected to the first injection module 170, the second inlet port 112 of the compressor 110, and the outdoor expansion valve 140.

In the heating operation, the second injection module 180 directs a part of the refrigerant flowing from the first injection module 170 to the second inlet port 112 of the compressor 110 and injects it to the low pressure side of the compressor 110, and directs another part of the refrigerant flowing from the first injection module 170 to the outdoor expansion valve 140.

In the defrosting operation, depending on the frosting injection condition to be described later, the second injection module 180 may direct a part of the refrigerant flowing from the outdoor heat exchanger 120 to the second inlet port 112 of the compressor 110 and inject it into the low pressure side of the compressor 110, and may direct another part of the refrigerant flowing from the outdoor heat exchanger 120 to the first injection module 170.

In the defrosting operation, the second injection module 180 does not operate under the frosting injection condition, but may bypass the refrigerant flowing from the outdoor heat exchanger 120 and direct it to the first injection module 170.

The second injection module 180 comprises a second injection expansion valve 181 for expanding a part of a flowing refrigerant and a second injection heat exchanger 182 for performing overcooling by exchanging heat between another part of the flowing refrigerant and the refrigerant expanded by the second injection expansion valve 181.

The second injection expansion valve 181 is connected to the first injection heat exchanger 172 and the second injection heat exchanger 182. The second injection expansion valve 181 expands the refrigerant injected from the indoor heat exchanger 130 into the compressor 110.

In the heating operation, the second injection expansion valve 181 expands part of the refrigerant discharged and branched off from the first injection heat exchanger 172 and directs it to the second injection heat exchanger 182. In the heating operation, the degree of opening of the second injection expansion valve 181 is adjusted such that the pressure of the refrigerant passing through it is equal to the pressure at the low pressure side of the compressor 110 to which the second inlet port 112 is connected.

In the defrosting operation, the second injection expansion valve 181 may expand part of the refrigerant passed through the outdoor expansion valve 140 and direct it to the second injection heat exchanger 182 after exchanging heat in the outdoor heat exchanger 130. In the defrosting operation, the second injection expansion valve 181 may be closed, and the second injection module 180 therefore may not operate.

The second injection heat exchanger 182 is connected to the first injection heat exchanger 172, the second injection expansion valve 181, the second inlet port 112 of the compressor 110, and the outdoor expansion valve 140. In the heating operation, the second injection heat exchanger 182 may exchange heat between the refrigerant flowing from the first injection module 170 and the refrigerant expanded by the second injection expansion valve 181, and, in the defrosting operation, it may allow the refrigerant flowing in the outdoor heat exchanger 120 and the refrigerant expanded by the second injection expansion valve 181 to pass through after or without exchanging heat in the defrosting operation.

In the heating operation, the second injection heat exchanger 182 exchanges heat between part of the refrigerant discharged and branched off from the first injection heat exchanger 172 and the refrigerant expanded by the second injection expansion valve 181. In the heating operation, the refrigerant overcooled in the second injection heat exchanger 182 flows to the outdoor expansion valve 140, and the overheated refrigerant is injected into the second inlet port 112 of the compressor 110.

In the defrosting operation, the second injection heat exchanger 182 may exchange heat between the refrigerant passed through the outdoor expansion valve 140 after exchanging heat in the outdoor heat exchanger 120 and the refrigerant expanded by the second injection valve 181. In the defrosting operation, the refrigerant overcooled in the second injection heat exchanger 182 may flow to the first injection module 170, and the overheated refrigerant may be injected into the second inlet port 112 of the compressor 110.

In the defrosting operation, if the second injection expansion valve 181 is closed, the second injection heat exchanger 182 may bypass the refrigerant flowing from the outdoor expansion valve 140 after exchanging heat in the outdoor heat exchanger 120 and direct it to the first injection module 170.

The above-described second injection module 180 may not be comprised of the second injection expansion valve 181 and the second injection heat exchanger 182, but instead may be a gas-liquid separator that separates gaseous refrigerant and liquid refrigerant so that the gaseous refrigerant is injected.

Hereinafter, a description will be given of how an air conditioner according to an exemplary embodiment of the present invention works in the heating operation, with reference to FIG. 1.

The refrigerant compressed by the compressor 110 is discharged through the discharge port 114 and flows to the switching part 190. In the heating operation, since the switching part 190 connects the discharge port 114 of the compressor 110 and the indoor heat exchanger 130, the refrigerant flowing to the switching part 190 flows to the indoor heat exchanger 130.

The refrigerant flowing from the switching part 190 to the indoor heat exchanger 130 is condensed as it exchanges heat with indoor air. The refrigerant condensed in the indoor heat exchanger 130 flows to the indoor expansion valve 150. In the heating operation, since the indoor expansion valve 150 is fully opened, it allows the refrigerant to pass through and directs it to the first injection module 170.

Part of the refrigerant flowing from the indoor expansion valve 150 may be injected from the first injection module 170 and/or second injection module 180 and supplied to the compressor 110, and the entire or part of the refrigerant flowing from the indoor expansion valve 150 is not injected from the first injection module 170 and/or second injection module 180 but is directed to the outdoor expansion valve 140.

The refrigerant flowing to the outdoor expansion valve 140 is expanded and directed to the outdoor heat exchanger 120. The refrigerant flowing to the outdoor heat exchanger 120 is evaporated by exchanging heat with the outdoor air. The refrigerant evaporated in the outdoor heat exchanger 120 flows to the switching part 190.

The refrigerant expanded by the outdoor expansion valve 140 is directed to the indoor heat exchanger through a connecting pipe 144, in the form of a refrigerant mixture of liquid refrigerant and gaseous refrigerant. In this instance, the refrigerant is concentrated at the bends due to the difference in specific gravity between the liquid refrigerant and the gaseous refrigerant. If the liquid refrigerant and the gaseous refrigerant are distributed to the refrigerant tube of the heat exchanger without considering this, the refrigerant is non-uniformly distributed, and this leads to a decrease in heat exchange efficiency. Needless to say, the refrigerant flowing to the heat exchanger may be non-uniformly distributed within the refrigerant tube due to various causes, and this leads to a decrease in the heat exchange efficiency of the heat exchanger.

To solve the aforementioned problem, in this exemplary embodiment, a flow disturbance apparatus may be installed on a refrigerant pipe where refrigerant flows. It is obvious that the flow disturbance apparatus of the present invention may be manufactured integrally with or separately from the refrigerant pipe.

Preferably, the flow disturbance apparatus may be disposed on the connecting pipe 144 to distribute the liquid refrigerant and the gaseous refrigerant uniformly throughout the refrigerant tube of the heat exchanger, or may be disposed on a pipe connecting the indoor heat exchanger 130 and the compressor 110.

Specifically, in the cooling operation, the refrigerant entering the refrigerant tube of the indoor heat exchanger 130 is disturbed through the flow disturbance apparatus of this exemplary embodiment, and in the heating operation, the refrigerant entering the refrigerant tube of the outdoor heat exchanger 120 is disturbed through the flow disturbance apparatus of this exemplary embodiment.

Hereinafter, the flow disturbance apparatus 10 of the present invention will be described in detail.

Figure 2:
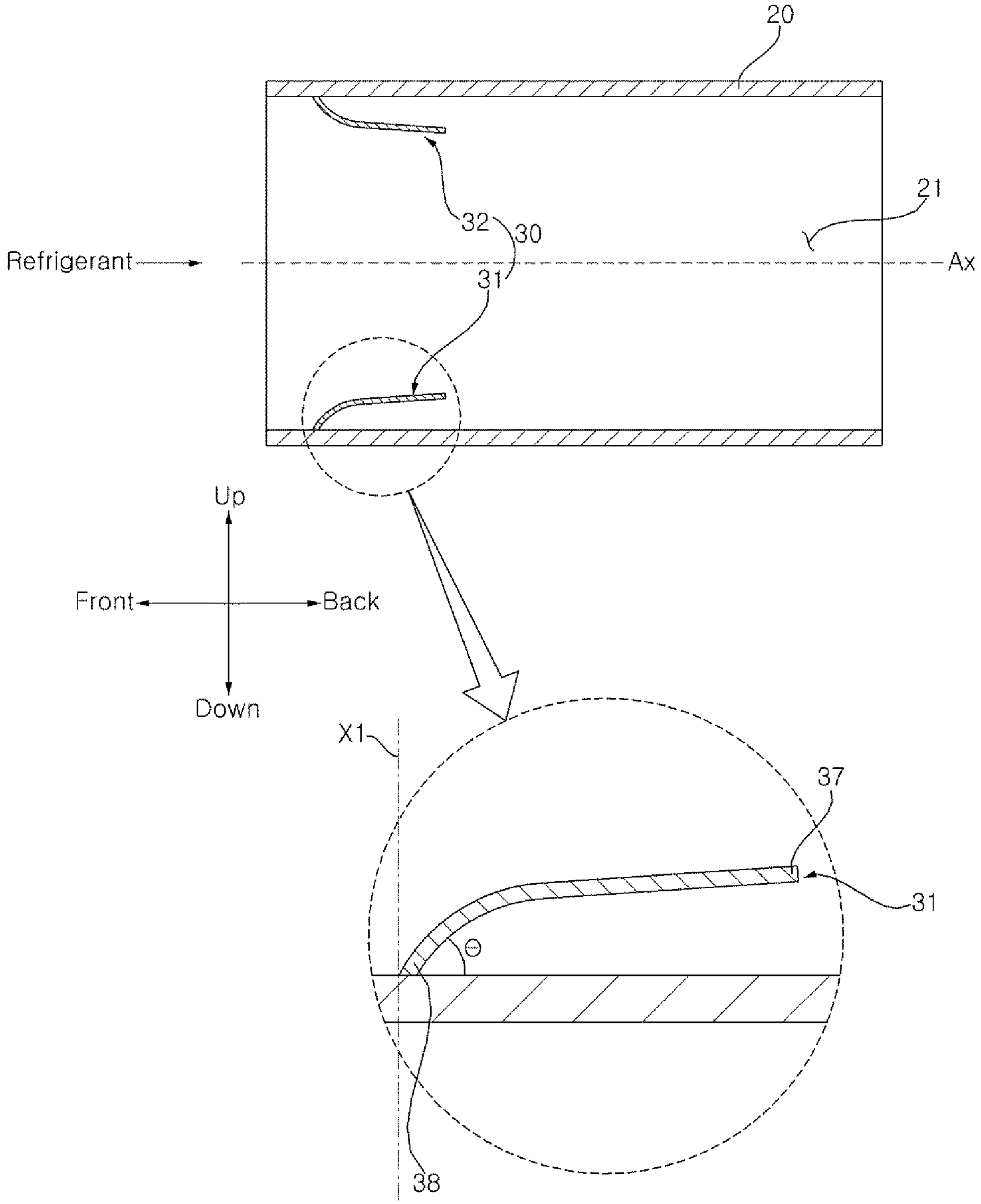
FIG. 2 is a cross-sectional view of a flow disturbance apparatus according to a first exemplary embodiment of the present invention.
Figure 3:
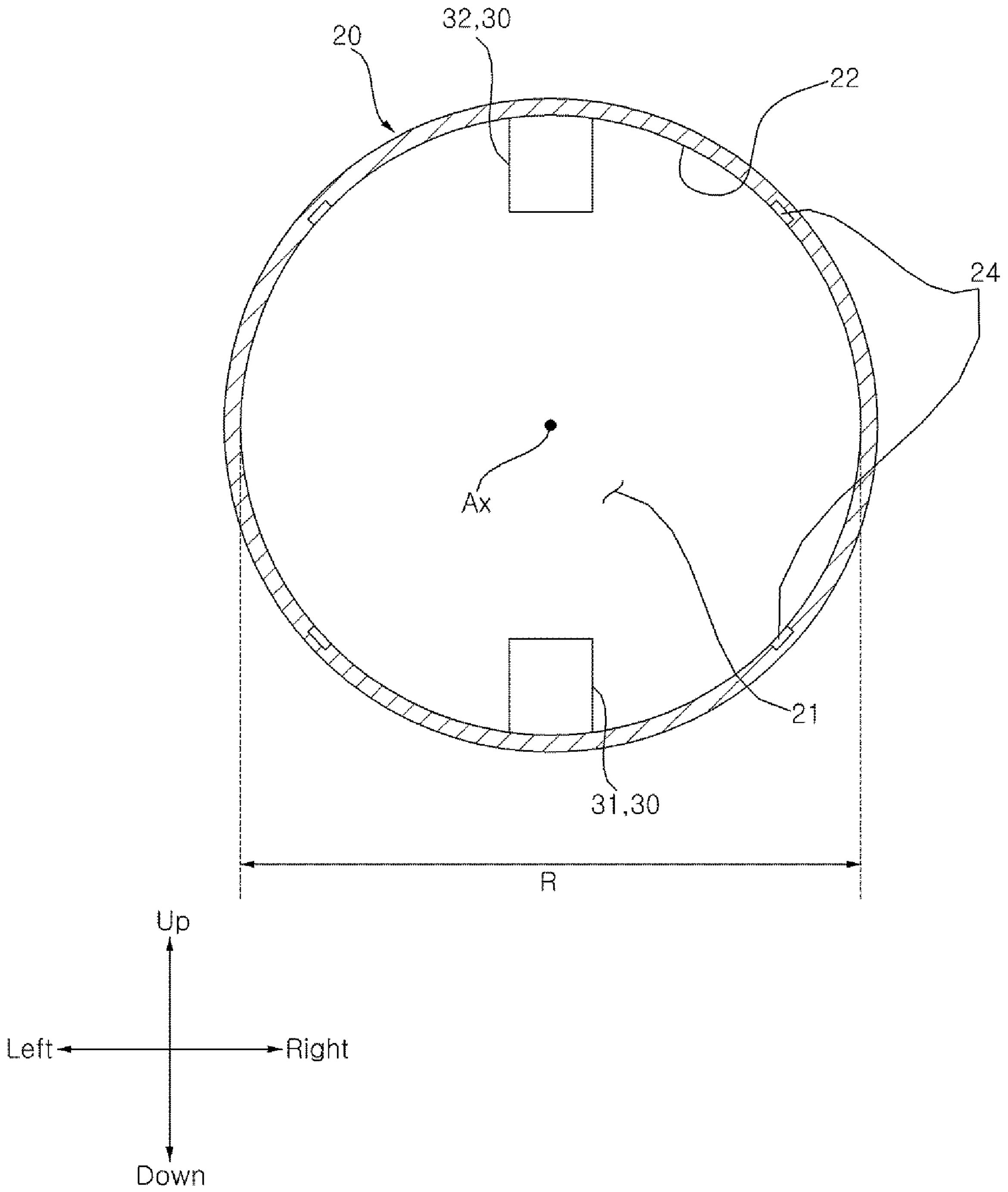
FIG. 3 is a cross-sectional view of the flow disturbance apparatus, taken in a different direction from that in FIG. 2.

FIG. 2 is a cross-sectional view of a flow disturbance apparatus according to a first exemplary embodiment of the present invention. FIG. 3 is a cross-sectional view of the flow disturbance apparatus, taken in a different direction from that in FIG. 2. FIG. 2 is a cross-sectional view of the flow disturbance apparatus according to the first exemplary embodiment of the present invention, taken in a direction parallel to the front-back direction which is parallel to the direction of refrigerant flow. FIG. 3 is a cross-sectional view of the flow disturbance apparatus, taken in the up-down direction which intersects the front-back direction.

Referring to FIGS. 2 and 3, the flow disturbance apparatus 10 according to an exemplary embodiment of the present invention comprises a refrigerant pipe 20 having a flow space 21 in which refrigerant flows and at least one disturbance member 30 disposed inside the refrigerant pipe 20, that is vibrated by the flow of refrigerant in the refrigerant pipe 20 to disturb the refrigerant flowing in the refrigerant pipe 20.

The refrigerant pipe 20 internally has a flow space 20 through which refrigerant passes. Specifically, the refrigerant pipe 20 is in the shape of a metal pipe with high heat exchange rate. The refrigerant pipe 20 has a circular or elliptical cross-sectional shape.

The refrigerant mixture of liquid refrigerant and gaseous refrigerant flows into one end of the refrigerant pipe 20 and flows out to the other end. One end of the refrigerant pipe 20 is connected to the outdoor expansion valve 140, and the other end is connected to the indoor expansion valve 150.

The disturbance member 30 disturbs the refrigerant flowing in the refrigerant pipe 20. The refrigerant flowing in the refrigerant pipe 20 is non-uniformly distributed due to various causes such as gravity and bending. Thus, the disturbance member 30 forms a vortex in the refrigerant pipe 20 to disturb the refrigerant in the refrigerant pipe 20, thus causing an increase in disorder according to the entropy law. As a consequence, the refrigerant is uniformly distributed in the refrigerant flow space 21.

The disturbance member 30 is disposed inside the refrigerant pipe 20 and vibrated by the flow of refrigerant in the refrigerant pipe 20 to disturb the refrigerant flowing in the refrigerant pipe 20. The disturbance member 30 is naturally vibrated by the pressure or flow force of the refrigerant flowing in the refrigerant pipe 20 without external energy supply, and forms a vortex of refrigerant at the rear of the disturbance member 30 due to this vibration.

For example, one end of the disturbance member 30 is a fixed end 38 connected to an inner surface 22 of the refrigerant pipe 20, and the other end of the disturbance member 30 is a free end 37 positioned in the flow space 21 of the refrigerant pipe 20. Specifically, one end of the disturbance member 30 is connected to the inner surface 22 of the refrigerant pipe 20, and the other end of the disturbance member 30 extends into the flow space 21 of the refrigerant pipe 20. The disturbance member 30 works in such a way that the fixed end 38 of the disturbance member 30 acts as the center of vibration, causing the other end of the disturbance member 30 to vibrate.

As shown in FIG. 3, the disturbance member 30 has a predetermined surface area when viewed from a cross-sectional plane perpendicular to the front and back, when the refrigerant in the refrigerant pipe 20 flows from the front to the back. If the disturbance member 30 has a given surface area when viewed from a cross-sectional plane perpendicular to the front and back, it creates resistance against the flow of refrigerant and the disturbance member 30 vibrates.

The surface area the disturbance member 30 occupies on the cross-sectional plane perpendicular to the front and back is preferably 2% to 15% of the cross-sectional area of the flow space 21 in the refrigerant pipe 20. If the surface area the disturbance member 30 occupies on the cross-sectional plane perpendicular to the front and back is greater than 15% of the cross-sectional area of the flow space 21 in the refrigerant pipe 20, there are problems like a large decrease in the flow velocity of the refrigerant and an increase in pressure loss. On the other hand, if the surface area the disturbance member 30 occupies on the cross-sectional plane perpendicular to the front and back is less than 2% of the cross-sectional area of the flow space 21 in the refrigerant pipe 20, the disturbance member 30 has lower resistance and vibrates less, thus leading to non-uniform mixing of refrigerants.

The length L (see FIG. 4*a*) of the disturbance member is usually 0.3 to 0.75 times the radius R of the refrigerant pipe 20. Preferably, the highest efficiency can be achieved when the length L (see FIG. 4*a*) of the disturbance member is 0.57 times the radius R of the refrigerant pipe 20.

The positions of the fixed end 38 and free end 37 of the disturbance member 30 are determined in consideration of the elasticity and stiffness of the disturbance member 30. Specifically, the fixed end 38 of the disturbance member 30 is disposed ahead of the free end 37 of the disturbance member 30. If the fixed end 38 of the disturbance member 30 is disposed ahead of the free end 37 of the disturbance member 30, this creates high resistance against the resistance flowing from the front to the back, causing deformation of the disturbance member 30 beyond its elasticity, which, in turn, may lead to a loss of the function of the disturbance member 30 or cause the disturbance member 30 to fall out from the refrigerant pipe 20.

The disturbance member 30 may have a slope in one direction. Specifically, the disturbance member 30 have a slope 8 between a reference line X1 perpendicular to the refrigerant pipe 20 and the back. Also, the angle of slope of the fixed end 38 of the disturbance member 30 may be larger than or equal to the angle of slope of the free end 37 of the disturbance member 30. Accordingly, the concentration of stress on the fixed end 38 of the disturbance member 30 may be alleviated.

The disturbance member 30 may have a shape including linear or curved.

The disturbance member 30 is made of a material with a predetermined level of stiffness and elasticity. The disturbance member 30 may be made using a flexible material. The disturbance member 30 comprises a metal or resin material. Preferably, the disturbance member 30 may be made of the same material as the refrigerant pipe 20 for the ease of manufacture. If the disturbance member 30 is metal, the bending coefficient of the disturbance member 30 is preferably from 0.04 to 0.08.

The number of disturbance members 30 is not limited. At least one disturbance member 30 may be provided. The disturbance member 30 may be disposed only in a given region of the refrigerant pipe 20, or may be disposed with a given pitch throughout the entire refrigerant pipe 20.

The disturbance member 30 may comprise an upper disturbance member 32 on one side of the refrigerant pipe 20 and a lower disturbance member 31 on the other side facing the one side of the refrigerant pipe 20.

The upper disturbance member 32 and the lower disturbance member 31 are disposed to face each other with respect to the center axis of the refrigerant pipe 20 A plurality of upper disturbance members 32 and lower disturbance members 31 may be disposed in the direction of travel of refrigerant.

In this case, the upper disturbance member 32 and the lower disturbance member 31 may overlap in an up-down direction. Specifically, the fixed end 38 of the upper disturbance member 32 and the fixed end 38 of the lower disturbance member 31 may overlap vertically. It is needless to say that, as described later, the upper disturbance member 32 and the lower disturbance member 31 may not overlap in an up-down direction.

A disturbance groove 24 may be formed on the inner surface 22 of the refrigerant pipe 20 to disturb the refrigerant. The disturbance groove 24, along with the disturbance member 30, disturbs the refrigerant flowing in the refrigerant pipe 20.

The disturbance groove 24 is formed by recessing a part of the inner surface 22 of the refrigerant pipe 20. The disturbance groove 24 is formed by recessing the inner surface 22 of the refrigerant pipe 20 outward. A vortex is formed as the refrigerant flowing in the flow space 21 of the refrigerant pipe 20 passes through around the disturbance groove 24, and, in turn, refrigerants are mixed at the back of the disturbance groove 24. The vortex created at the back of the disturbance groove 24 and the vortex created at the back of the disturbance member 30 have different patterns, which achieves a flow of refrigerant with higher disorder and higher uniformity.

At least one disturbance groove 24 may be disposed. A plurality of disturbance grooves 24 may be disposed with a given pitch in the direction of travel of refrigerant. Preferably, disturbance grooves 24 and disturbance members 30 may be disposed in such a way as not to overlap within a certain length of the refrigerant pipe 20 in the front-back direction, when viewed from a cross-section perpendicular to the front-back direction. The disturbance grooves 24 may be disposed in such a way as not to overlap the disturbance members 30 in the front-back direction. This way, the disturbance grooves 24 and the disturbance members 30 are disposed in such a way as not to overlap within a certain area, thereby allowing for efficient mixing of refrigerants.

Hereinafter, a structure the disturbance member 30 requires for efficient vibration will be described in detail with reference to FIG. 4.

Figure 4A:
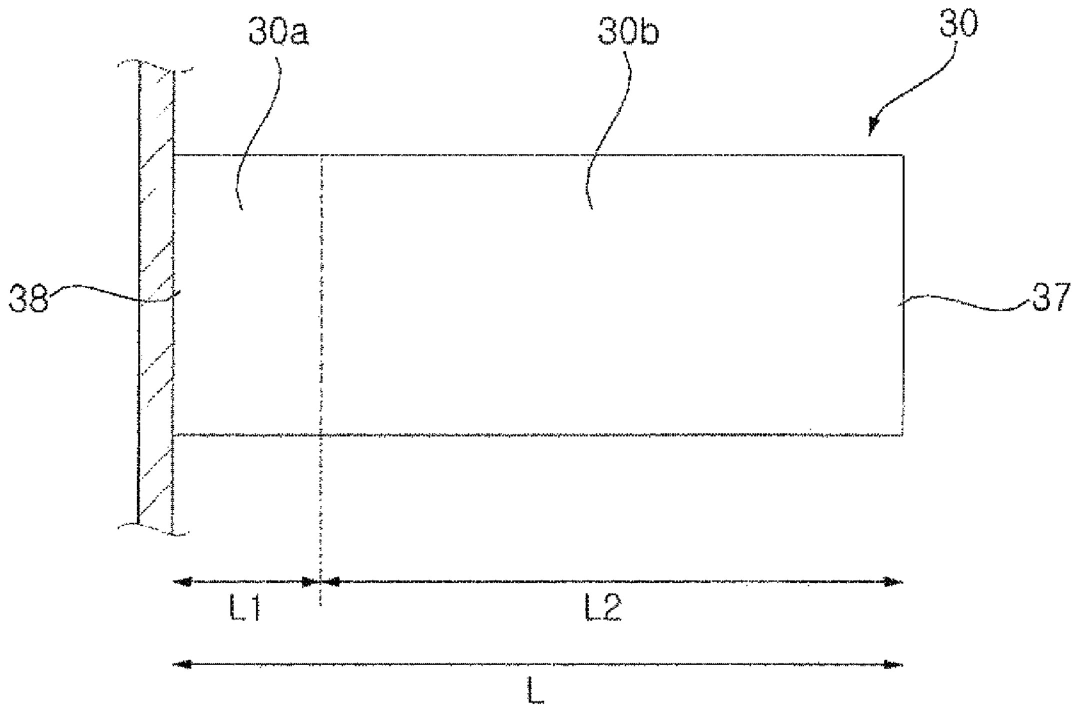
FIG. 4*a* is a conceptual diagram illustrating an embodiment of the disturbance member shown in FIG. 2.

FIG. 4*a* is a conceptual diagram illustrating an embodiment of the disturbance member 30 shown in FIG. 2.

Referring to FIG. 4*a*, the disturbance member 30 is divided into a blade portion 30*b* and a connecting portion 30*a*.

The blade portion 30*b* is a region that is vibrated by the flow of refrigerant. One end of the blade portion 30*b* is connected to the connecting portion 30*a*, and the other end is the free end 37. The blade portion 30*b* has a predetermined level of stiffness. Preferably, in order for the disturbance member 30 to vibrate with respect to the connecting portion 30*a*, the blade portion 30*b* may have higher stiffness, lower elasticity, and lower ductility than the connecting portion 30*a*.

The connecting portion 30*a* fixes the blade portion 30*b* to the refrigerant pipe 20 and keeps the blade portion 30*b* from falling out when the blade portion 30*b* vibrates. One end of the connecting portion 30*a* is connected to the blade portion 30*b*, and the other end is connected to the inner surface 22 of the refrigerant pipe 20. Preferably, in order for the disturbance member 30 to vibrate with respect to the connecting portion 30*a*, the connecting portion 30*a* may have higher elasticity or higher ductility than the blade portion 30*b*.

Overall, the blade portion 30*b* is disposed closer to the center of the refrigerant pipe 20 than the connecting portion 30*a*.

There is no limit to the overall length of the disturbance member 30. Considering the disturbance in the flow of refrigerant, the overall length of the disturbance member 30 is preferably smaller than the radius of the refrigerant pipe 20.

Although there are no limits to the lengths of the connecting portion 30*a* and blade portion 30*b*, the length L1 of the blade portion 30*b* is preferably larger than the length L2 of the connecting portion 30*a*, in order to create an efficient vortex by the movement of the blade portion 30*b*. The length L1 of the blade portion 30*b* is two to ten times the length L2 of the connecting portion 30*a*.

Figure 4B:
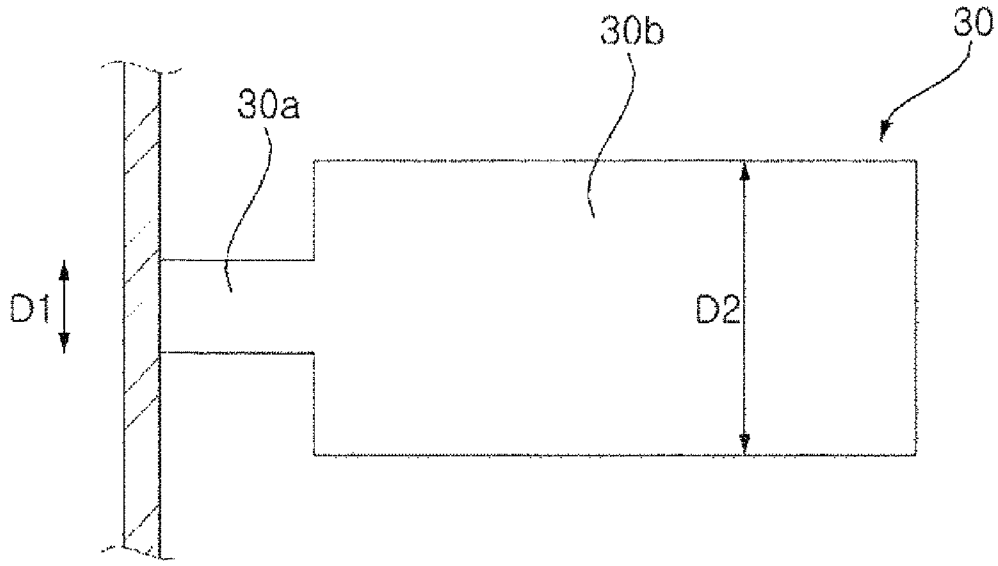
FIG. 4*b* is a conceptual diagram illustrating another embodiment of the disturbance member shown in FIG. 2.

FIG. 4*b* is a conceptual diagram illustrating another embodiment of the disturbance member 30 shown in FIG. 2.

Referring to FIG. 4*b*, in the disturbance member 30 according to another embodiment, the width D2 of the blade portion 30*b* is larger than the width D1 of the connecting portion 30*a*. Here, the structure of the refrigerant pipe 20 and the structure of the disturbance member 30 may be the same as those exemplified above, and descriptions thereof will be replaced with the foregoing description.

In the embodiment in FIG. 4*b*, the blade portion 30*b* and the connecting portion 30*a* differ in width D1 as compared to the embodiment in FIG. 4*a*.

The width D2 of the blade portion 30*b* is larger than the width D1 of the connecting portion 30*a*, and the blade portion 30*b* is disposed closer to the center of the refrigerant pipe 20 than the connecting portion 30*a*. Thus, even if the connecting portion 30*a* and the blade portion 30*b* are made of the same material, the blade portion 30*b* vibrates with respect to the connecting portion 30*a* due to the difference in width.

Needless to say, in a case where the connecting portion 30*a* is narrower in width than the blade portion 30*b*, the connecting portion 30*a* may be made of the same material as the blade portion 30*b* or may have higher elasticity and ductility than the blade portion 30*b*.

The width D2 of the blade portion 30*b* may discontinuously extend at a region where the connecting portion 30*a* and the blade portion 30*b* are connected, which may create a step difference between the connecting portion 30*a* and the blade portion 30*b*.

Figure 4C:
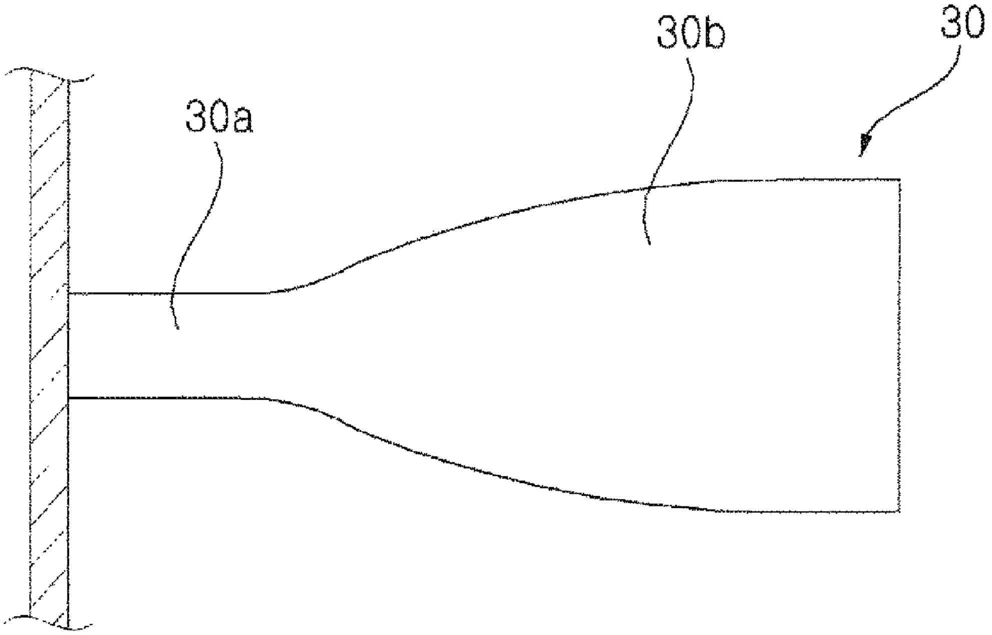
FIG. 4*c* is a conceptual diagram illustrating a further embodiment of the disturbance member shown in FIG. 2.

FIG. 4*c* is a conceptual diagram illustrating a further embodiment of the disturbance member 30 shown in FIG. 2.

Referring to FIG. 4*c*, in the disturbance member 30 according to a further embodiment, the width D2 of the blade portion 30*b* is larger than the width D1 of the connecting portion 30*a*. The blade portion 30 according to the embodiment in FIG. 4*c* has a different shape from that according to the embodiment in FIG. 4*b*.

The width D2 of the blade portion 30*b* is larger than the width D1 of the connecting portion 30*a*. The width D2 of the blade portion 30*b* increases gradually as it gets distant from the connecting portion 30*a*. Thus, the region where the blade portion 30*b* and the connecting portion 30*a* are connected is stepped, thereby alleviating the concentration of stress.

Figure 4D:
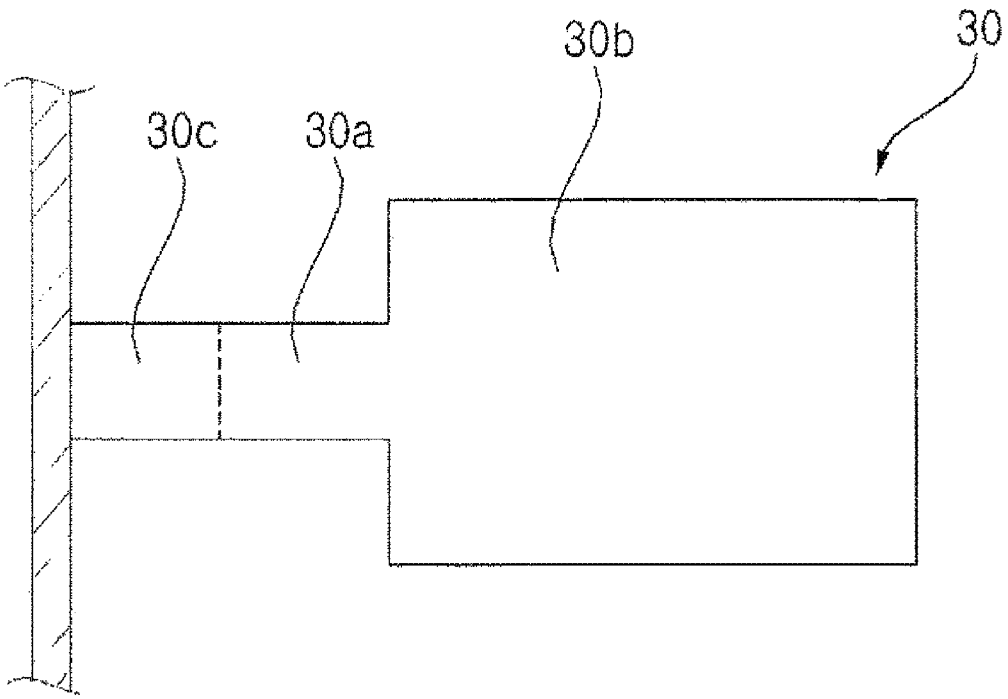
FIG. 4*d* is a conceptual diagram illustrating another embodiment of the disturbance member shown in FIG. 2.

FIG. 4*d* is a conceptual diagram illustrating a further embodiment of the disturbance member 30 shown in FIG. 2.

Referring to FIG. 4*d*, the disturbance member 30 according to a further embodiment further comprises a fixing portion 30*c*, as compared to the embodiment in FIG. 4*b*.

The fixing portion 30*c* connects the refrigerant pipe 20 and the connecting portion 30*a*. One end of the connecting portion 30*a* is connected to the fixing portion 30*c*, and the other end of the connecting portion 30*a* is connected to the blade portion 30*b*. In this case, the connecting portion 30*a* has at least one between a smaller width and higher elasticity than the blade portion 30*b* or both.

The fixing portion 30*c*, because of its high stiffness, fixes the connecting portion 30*a* to the refrigerant pipe 20 when the blade portion 30*b* vibrates with respect to the connecting portion 30*a*. Accordingly, the stiffness of the fixing portion 30*c* is preferably higher than the stiffness of the connecting portion 30*a*.

Figure 4E:
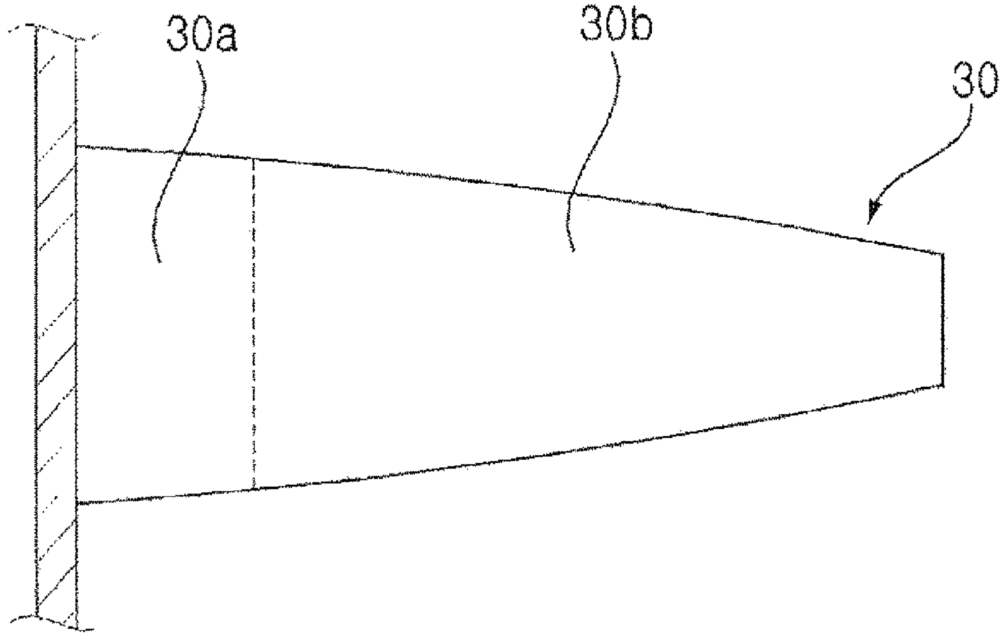
FIG. 4*e* is a conceptual diagram illustrating a further embodiment of the disturbance member shown in FIG. 2.

FIG. 4*e* is a conceptual diagram illustrating a further embodiment of the disturbance member 30 shown in FIG. 2.

Referring to FIG. 4*e*, in the disturbance member 30 according to a further embodiment, the width D2 of the blade portion 30*b* is smaller than the width D1 of the connecting portion 30*a*.

The width D2 of the blade portion 30*b* is smaller than the width D1 of the connecting portion 30*a*. The width D2 of the blade portion 30*b* decreases gradually as it gets distant from the connecting portion 30*a*.

Figure 4F:
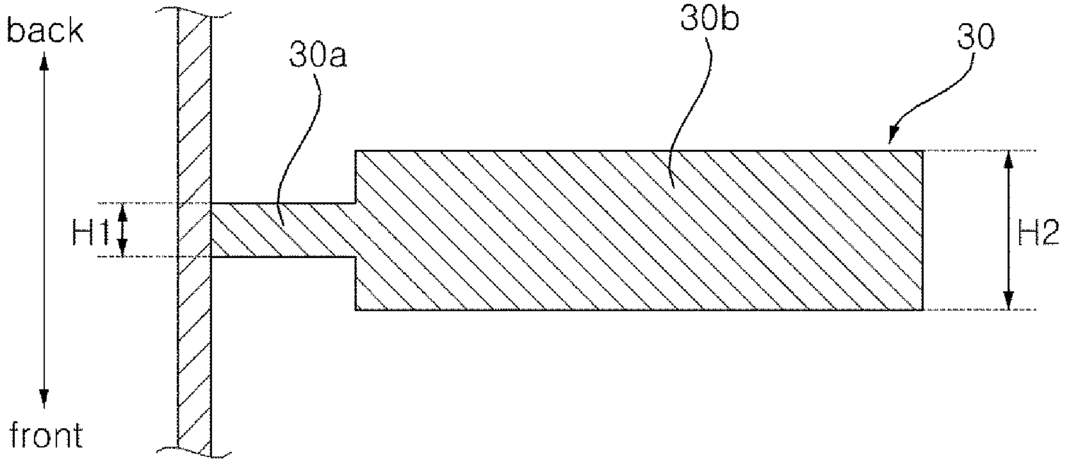
FIG. 4*f* is a conceptual diagram illustrating a further embodiment of the disturbance member shown in FIG. 2.

FIG. 4*f* is a conceptual diagram illustrating a further embodiment of the disturbance member 30 shown in FIG. 2.

Referring to FIG. 4*f*, the connecting portion 30*a* and blade portion 30*b* of the disturbance member 30 differ in thickness H2. Although the structure of the disturbance member 30 which is not explained in FIG. 4*f* may be any one of the structures exemplified above with reference to FIGS. 4*a* to 4*e*, this embodiment will be described with respect to the embodiment in FIG. 4*a*. Accordingly, a description thereof will be replaced with the foregoing description.

FIG. 4*f* shows a cross-section of the disturbance member 30, taken with respect to a plane perpendicular to the front-back direction.

The thickness H1 of the connecting portion 30*a* is smaller than the thickness H2 of the blade portion 30*b*. Thus, even if the connecting portion 30*a* and the blade portion 30*b* are made of the same material, the blade portion 30*b* vibrates with respect to the connecting portion 30*a* due to the difference in thickness.

Needless to say, in a case where the thickness H1 of the connecting portion 30*a* is smaller than the thickness H2 of the blade portion 30*b*, the connecting portion 30*a* may be made of the same material as the blade portion 30*b* or may have higher elasticity and ductility than the blade portion 30*b*.

The thickness H2 of the blade portion 30*b* may continuously or discontinuously change at a region where the connecting portion 30*a* and the blade portion 30*b* are connected.

Figure 5:
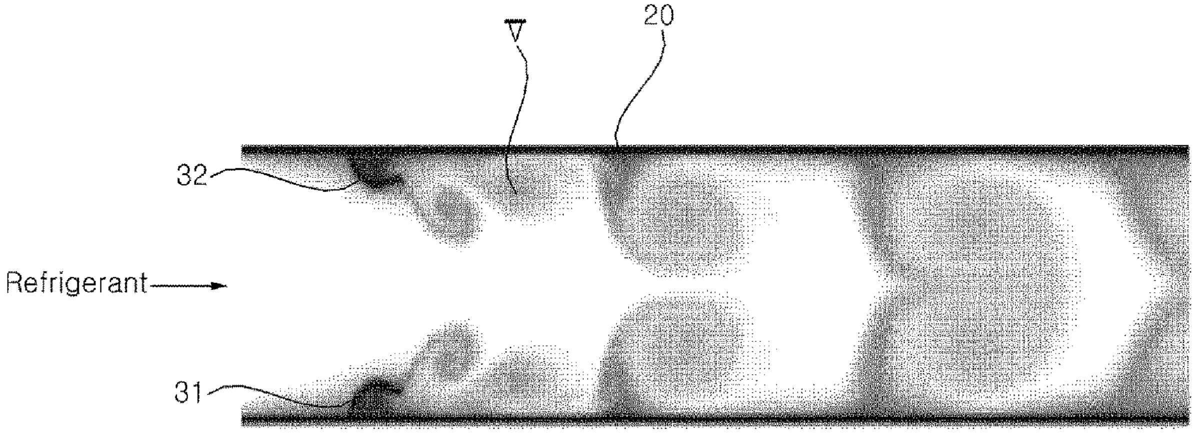
FIG. 5 is a reference view illustrating the flow of refrigerant created in the flow disturbance apparatus shown in FIG. 2.

FIG. 5 is a reference view illustrating the flow of refrigerant created in the flow disturbance apparatus 10 shown in FIG. 2.

Referring to FIG. 5, it can be seen that a vortex V is formed by the vibration of the disturbance member 30 at the back of the disturbance member 30, and that refrigerant is evenly disturbed.

Figure 6:
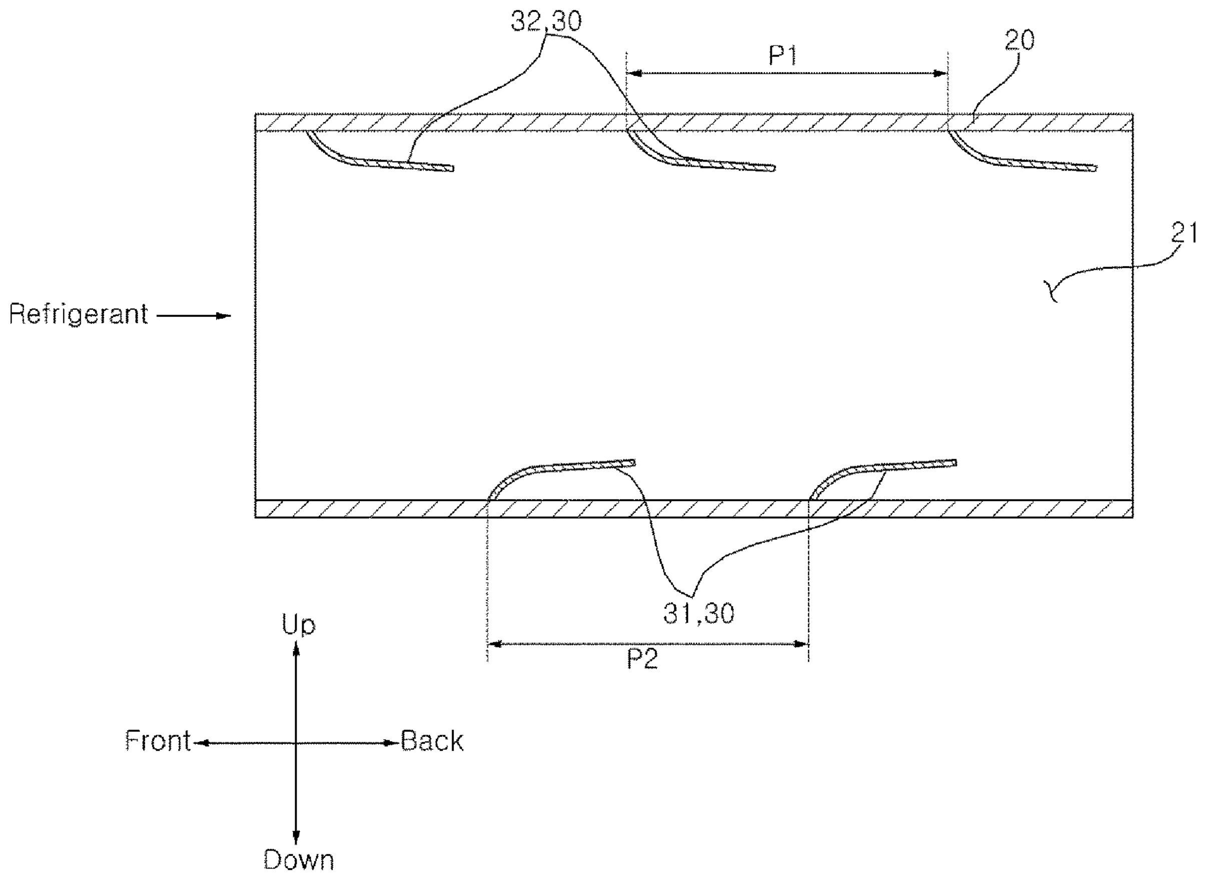
FIG. 6 is a cross-sectional view illustrating a flow disturbance apparatus according to a second exemplary embodiment of the present invention.

FIG. 6 is a cross-sectional view illustrating a flow disturbance apparatus 10 according to a second exemplary embodiment of the present invention.

Referring to FIG. 6, in the flow disturbance apparatus 10 according to the second exemplary embodiment, the position of the disturbance member 30 is different as compared to the first exemplary embodiment in FIG. 2.

The disturbance member 30 according to the second exemplary embodiment comprises a plurality of upper disturbance members 32 disposed in the direction of travel of refrigerant on one side of the refrigerant pipe 20 and a plurality of lower disturbance members 31 disposed in the direction of travel of refrigerant on the other side facing the one side of the refrigerant pipe 20.

The upper disturbance members 32 and the lower disturbance members 31 are disposed in such a way as not to overlap vertically. Specifically, the fixed ends 38 of the upper disturbance members 32 and the fixed ends 38 of the lower disturbance members 31 are disposed in such a way as not to overlap vertically.

Preferably, the pitch P1 between the upper disturbance members 32 and the pitch P2 between the lower disturbance members 31 are equal, though they may be different. The highest efficiency is achieved when the pitch P1 between the upper disturbance members 32 and the pitch P2 between the lower disturbance members 31 are two to three times the length L of the disturbance member 30. Preferably, the disturbance member 30 is 2.6 times the length L of the disturbance member 30.

Figure 7:
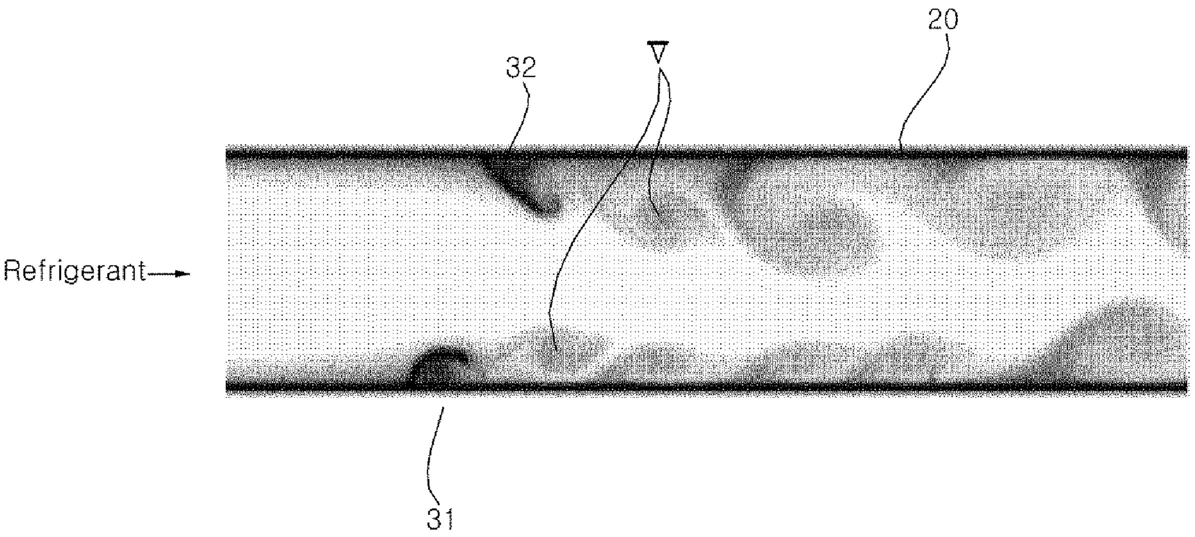
FIG. 7 is a reference view illustrating the flow of refrigerant created in the flow disturbance apparatus shown in FIG. 6.

FIG. 7 is a reference view illustrating the flow of refrigerant created in the flow disturbance apparatus 10 shown in FIG. 6.

Referring to FIG. 7, once the upper disturbance members 32 and the lower disturbance members 31 are disposed in such a way as not to overlap in the up-down direction, the refrigerant flowing in the refrigerant pipe 20 may be disturbed more efficiently.

Figure 8:
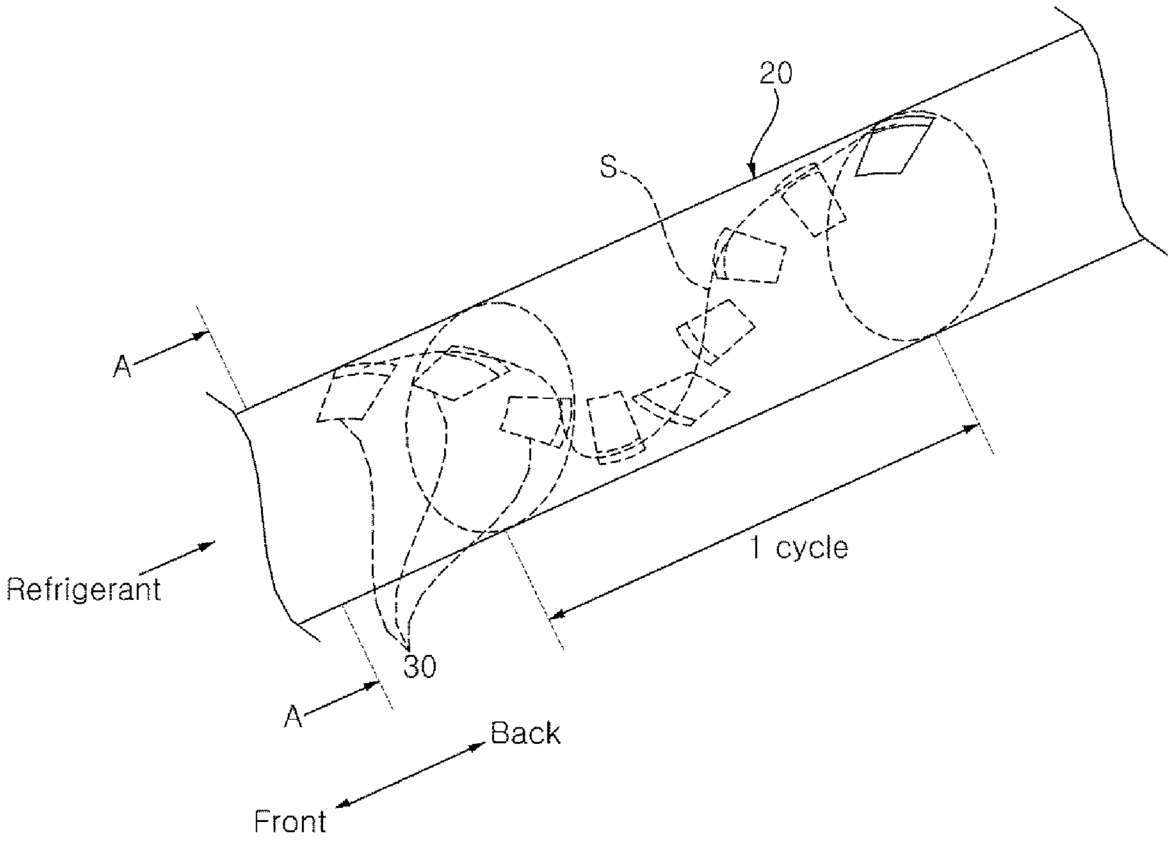
FIG. 8 is a conceptual diagram illustrating a flow disturbance apparatus according to a third exemplary embodiment of the present invention.
Figure 9:
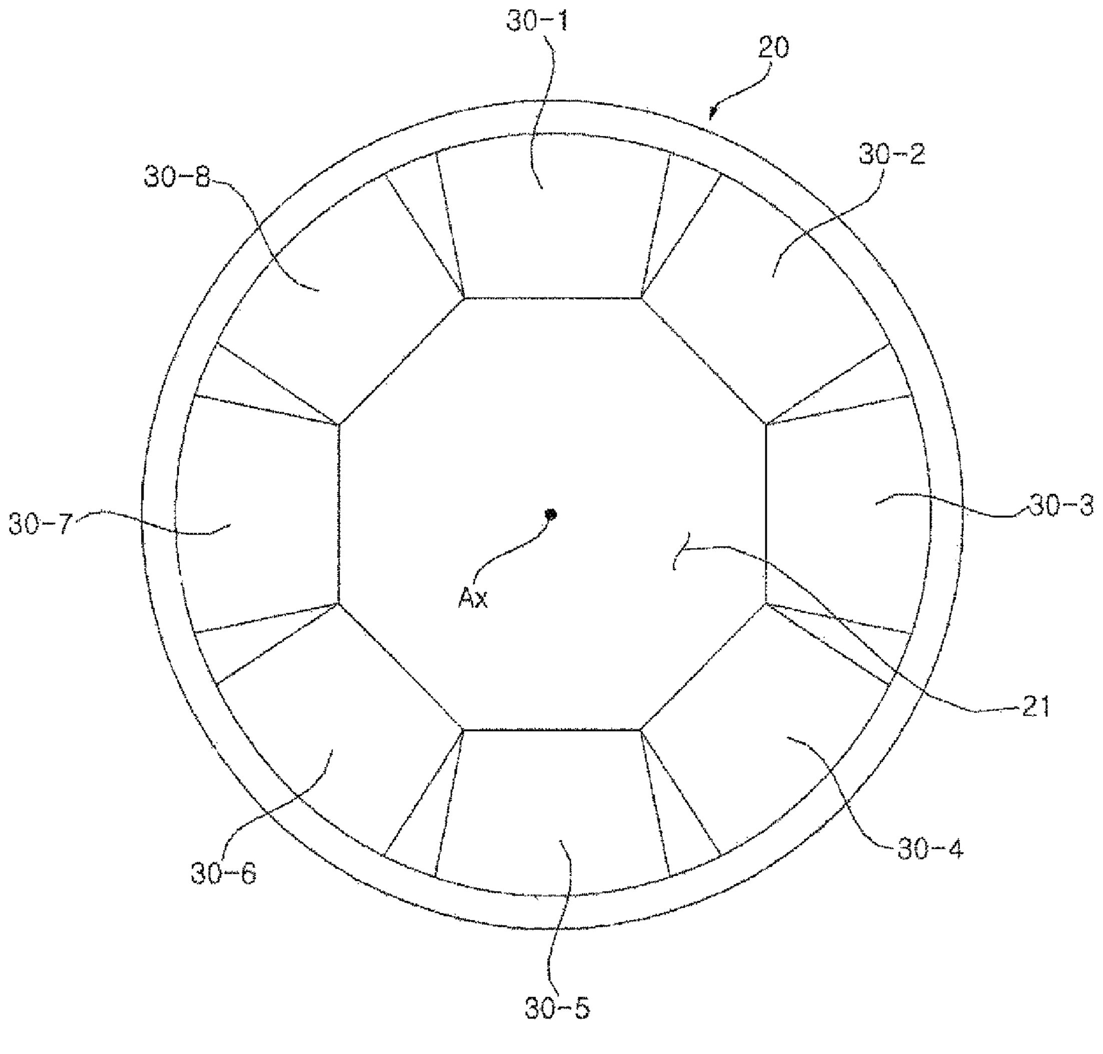
FIG. 9 is a cross-sectional view of the flow disturbance apparatus taken along the line A-A of FIG. 8.
Figure 10:
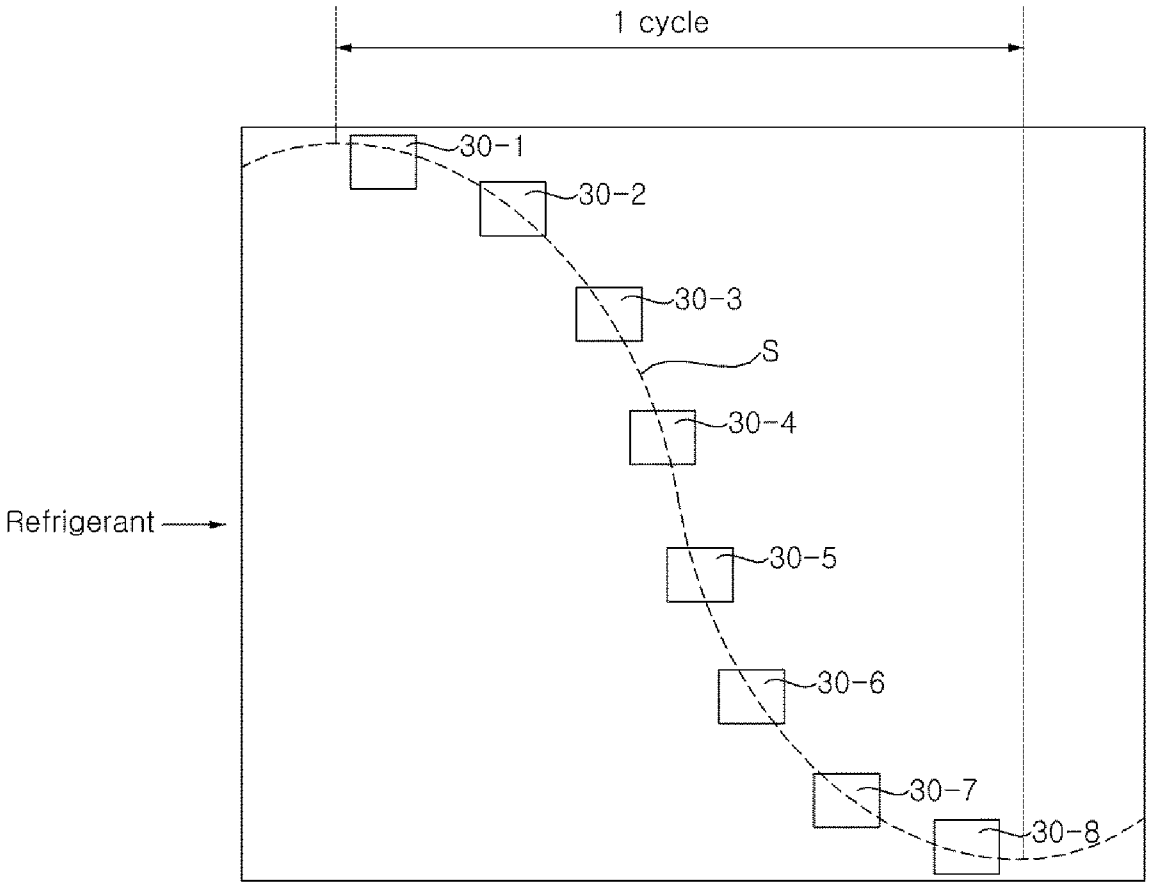
FIG. 10 is a development view of the flow disturbance apparatus shown in FIG. 8.

FIG. 8 is a conceptual diagram illustrating a flow disturbance apparatus 10 according to a third exemplary embodiment of the present invention. FIG. 9 is a cross-sectional view of the flow disturbance apparatus 10 taken along the line A-A of FIG. 8. FIG. 10 is a development view of the flow disturbance apparatus 10 shown in FIG. 8.

Referring to FIGS. 8 to 10, in the flow disturbance apparatus 10 according to the third exemplary embodiment, the position of the disturbance member 30 is different as compared to the first exemplary embodiment in FIG. 2.

A plurality of disturbance members 30 according to the third exemplary embodiment are disposed at intervals on a virtual spiral line S formed on the inner surface 22 of the refrigerant pipe 20. Specifically, the fixed ends 38 of the plurality of disturbance members 30 may be positioned on a virtual spiral line S formed on the inner surface 22 of the refrigerant pipe 20. In this case, the length of one cycle of the virtual spiral line S is determined in consideration of the efficiency of refrigerant flow and disturbance.

The disturbance members 30 are disposed in such a way as not to overlap within one cycle of the spiral line, when viewed in the direction of refrigerant flow. Once the disturbance members 30 are disposed in such a way as not to overlap within one cycle of the spiral line when viewed in the direction of refrigerant flow, refrigerant can be disturbed most efficiently within one cycle, while reducing the manufacturing cost.

The number of disturbance members 30 may vary within one cycle of the spiral line. In the third exemplary embodiment, eight disturbance members 30 (30-1 to 30-8) are disposed within one cycle of the spiral line, but the number of disturbance members 30 is not limited thereto.

Figure 11:
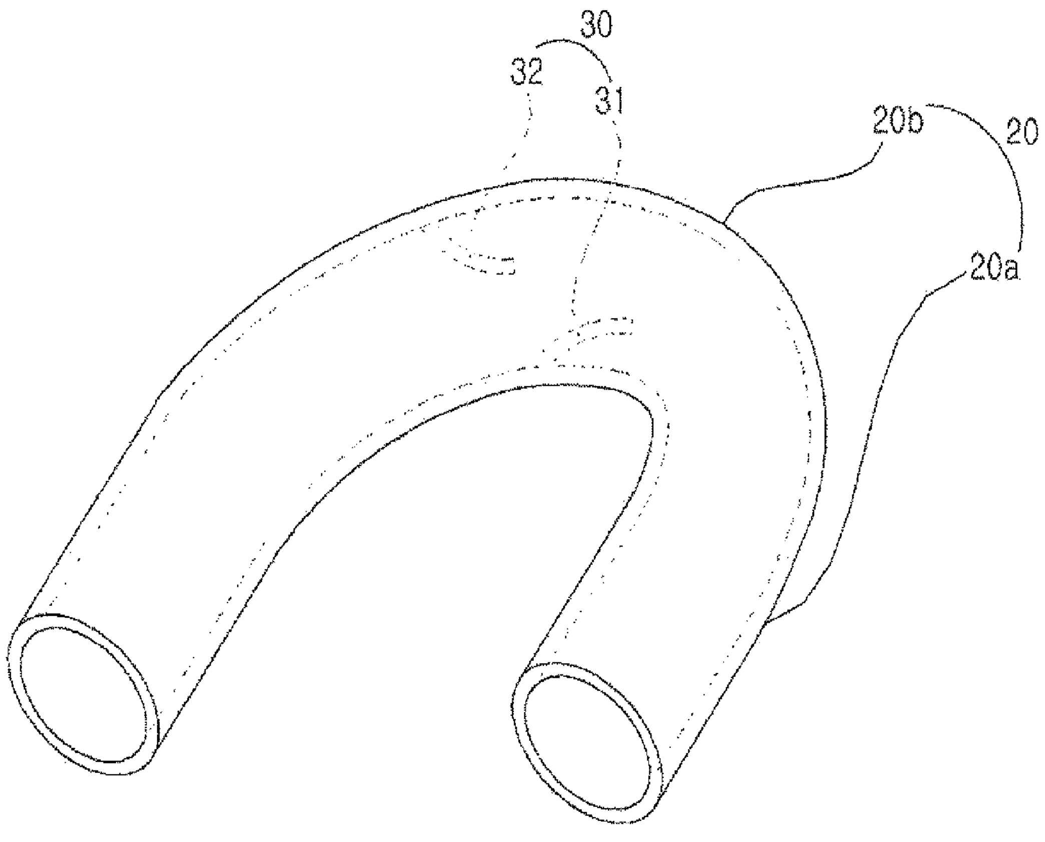
FIG. 11 is a cross-sectional view illustrating a flow disturbance apparatus according to a fourth exemplary embodiment of the present invention.

FIG. 11 is a cross-sectional view illustrating a flow disturbance apparatus 10 according to a fourth exemplary embodiment of the present invention.

Referring to FIG. 11, in the flow disturbance apparatus 10 according to the fourth exemplary embodiment, the structure of the refrigerant pipe 20 and the position of the disturbance member 30 are different as compared to the first exemplary embodiment in FIG. 2.

The refrigerant pipe 20 according to this exemplary embodiment comprises a bent region 20*b* in which the direction of refrigerant flow is switched and a flat region 20*a* in which the direction of refrigerant flow is constant. The bent region 20*b* is bent in one direction of the refrigerant pipe 20. In the drawing, a U-shaped pipe is illustrated.

As described above, refrigerant concentration occurs as the refrigerant passes through the bent region 20*b*. The refrigerant concentration occurs if the refrigerant is in an abnormal state.

In this case, the disturbance member 30 is disposed in the bent region 20*b*. Accordingly, the disturbance member 30 helps to alleviate the uneven distribution of refrigerant caused by the concentration of refrigerant in the bent region 20*b*.

The exemplary embodiments of the present invention have been described above with reference to the accompanying drawings, but it can be understood that the present invention is not limited to the exemplary embodiments, but may be embodied in various different forms, and the present invention may be implemented in other specific forms by those skilled in the technical field to which the present invention pertains without changing the technical spirit or essential features of the present invention. Therefore, it should be understood that the aforementioned exemplary embodiments are described for illustration in all aspects and are not limited.

The invention claimed is:

1. A flow disturbance apparatus, comprising:

a refrigerant pipe having a flow space in which refrigerant flows; and at least one disturbance member disposed inside of the refrigerant pipe, wherein the at least one disturbance member is vibrated by a flow of refrigerant in the refrigerant pipe to disturb the refrigerant flowing in the refrigerant pipe, wherein a first end of the at least one disturbance member is a fixed end connected to an inner surface of the refrigerant pipe, and a second end of the at least one disturbance member is a free end positioned in the flow space of the refrigerant pipe, wherein the at least one disturbance member comprises:

a blade portion having a predetermined width; and a connecting portion having a smaller width than the blade portion, wherein a boundary between the blade portion and the connecting portion includes a step, and wherein a length of the blade portion is greater than a length of the connecting portion, and wherein the connecting portion has a higher elasticity than the blade portion.

2. The flow disturbance apparatus of claim 1, wherein, in a direction of refrigerant flow, the fixed end of the at least one disturbance member is disposed downstream of the free end of the at least one disturbance member.

3. The flow disturbance apparatus of claim 1, wherein the blade portion is disposed closer to a center of the refrigerant pipe than the connecting portion.

4. The flow disturbance apparatus of claim 1, wherein the at least one disturbance member comprises a flexible material.

5. The flow disturbance apparatus of claim 1, wherein the at least one disturbance member comprises:

a plurality of upper disturbance members disposed in the direction of refrigerant flow on a first side of the refrigerant pipe; and a plurality of lower disturbance members disposed in the direction of refrigerant flow on a second side facing the first side of the refrigerant pipe, and wherein fixed ends of the plurality of upper disturbance members and fixed ends of the plurality of lower disturbance members do not overlap vertically.

6. The flow disturbance apparatus of claim 1, wherein the at least one disturbance member comprises a plurality of disturbance members disposed at intervals on a virtual spiral line formed on the inner surface of the refrigerant pipe.

7. The flow disturbance apparatus of claim 6, wherein the plurality of disturbance members is disposed in such a way as not to overlap within one cycle of the spiral line, when viewed in the direction of refrigerant flow.

8. The flow disturbance apparatus of claim 1, wherein the at least one disturbance member has a curvature.

9. The flow disturbance apparatus of claim 1, wherein the refrigerant pipe comprises a bent region in which the direction of refrigerant flow is switched, and the at least one disturbance member is disposed in the bent region.

10. The flow disturbance apparatus of claim 1, further comprising at least one disturbance groove formed on an inner surface of the refrigerant pipe to disturb the refrigerant.

11. The flow disturbance apparatus of claim 10, wherein the at least one disturbance groove is disposed in such a way as not to overlap the at least one disturbance member in a frontward-backward direction.

12. The flow disturbance apparatus of claim 10, wherein a length of the at least one disturbance member is smaller than a radius of the refrigerant pipe.

13. An air conditioner comprising the flow disturbance apparatus of claim 1.

14. An air conditioner, comprising:

a compressor that compresses refrigerant;

an outdoor heat exchanger that is installed outdoors and exchanges heat between outdoor air and the refrigerant;

an indoor heat exchanger that is installed indoors and exchanges heat between indoor air and the refrigerant; and a flow disturbance apparatus that disturbs the refrigerant flowing inside of the air conditioner, wherein the flow disturbance apparatus comprises:

a refrigerant pipe having a flow space in which refrigerant flows; and at least one disturbance member disposed inside of the refrigerant pipe, wherein the at least one disturbance member is vibrated by a flow of refrigerant in the refrigerant pipe to disturb the refrigerant flowing in the refrigerant pipe, wherein a first end of the at least one disturbance member is a fixed end connected to an inner surface of the refrigerant pipe, and a second end of the at least one disturbance member is a free end positioned in the flow space of the refrigerant pipe, and wherein the at least one disturbance member comprises:

a blade portion having a predetermined width; and a connecting portion having a smaller width than the blade portion, wherein a boundary between the blade portion and the connecting portion includes a step, wherein a length of the blade portion is greater than a length of the connecting portion, and wherein the connecting portion has a higher elasticity than the blade portion.

15. The air conditioner of claim 14, wherein, in a direction of refrigerant flow, the fixed end of the at least one disturbance member is disposed downstream of the free end of the at least one disturbance member.

16. The air conditioner of claim 14, wherein the blade portion is disposed closer to a center of the refrigerant pipe than the connecting portion.

17. The air conditioner of claim 14, wherein the at least one disturbance member comprises a flexible material.

18. The air conditioner of claim 14, wherein the at least one disturbance member comprises:

a plurality of upper disturbance members disposed in the direction of refrigerant flow on a first side of the refrigerant pipe; and a plurality of lower disturbance members disposed in the direction of refrigerant flow on a second side facing the first side of the refrigerant pipe, and wherein fixed ends of the plurality of upper disturbance members and fixed ends of the plurality of lower disturbance members do not overlap vertically.

* * * * *